United States Patent [19]

Hardesty

[11] 3,983,892

[45] Oct. 5, 1976

[54] EXPLOSIVE VALVE

[75] Inventor: Thomas K. C. Hardesty, Ednor, Md.

[73] Assignee: The United States of America as represented by the Secretary of the Navy, Washington, D.C.

[22] Filed: Dec. 6, 1974

[21] Appl. No.: 530,261

[52] U.S. Cl. .......................... 137/68 A; 85/DIG. 1; 89/1 B; 220/89 A; 220/261
[51] Int. Cl.² ....................................... F16K 17/40
[58] Field of Search .................... 220/89 A, 261; 137/68 A, 69, 71; 89/1 B; 85/DIG. 1; 102/49.5; 222/5

[56] References Cited
UNITED STATES PATENTS

| 2,276,830 | 3/1972 | Doran | 220/89 A |
| 3,109,553 | 11/1963 | Fike et al. | 137/68 A X |
| 3,267,662 | 8/1966 | Miller | 220/89 A |
| 3,437,035 | 4/1969 | Weimholt | 220/89 A |
| 3,469,733 | 9/1969 | Montgomery et al. | 220/89 A |
| 3,604,511 | 9/1971 | Griffith et al. | 220/89 A |
| 3,777,772 | 12/1973 | Arnold et al. | 137/68 A |

Primary Examiner—Martin P. Schwadron
Assistant Examiner—Richard Gerard
Attorney, Agent, or Firm—R. S. Sciascia; A. L. Branning; F. K. Yee

[57] ABSTRACT

An assembly for explosively shearing material to form openings in containers and to separate attached elements comprises an explosive material positioned within a groove in a backing support adjacent one side of the material to be severed. A shear element located on the other side of the material has its shearing edge axially aligned with the centerline of the groove and explosive material. Upon detonation, the explosive pressure forcibly displaces the material against the shearing edge, severing the material without fragmentation.

19 Claims, 6 Drawing Figures

EXPLOSIVE VALVE

BACKGROUND OF THE INVENTION

The invention relates to quick-opening valves of the rupturable-diaphragm type and more particularly to the explosive shearing of closure diaphragms to produce fragment-free openings therein.

Rupturable diaphragm valves find use in numerous fields. Such valves have traditionally been used for the protection of pressure vessel and other equipment wherein a dome-shaped, frangible diaphragm ruptures at a predetermined pressure. These valves are also used to produce an instantaneous flow of high-velocity gas, such as in a shock tunnel to study the reaction of aerodynamic shapes in high-speed air flows. Another use of such devices is to seal a compartment, such as in a submerged weapon or other marine hardware, and then to flood the compartment at some later time.

The traditional rupture valves are not entirely satisfactory in a variety of uses because they are designed to rupture at a predetermined pressure differential and not at the command of an operator. Furthermore, small variations in rupture pressures between individual diaphragm and the inability to confine the fluid at the desired rupture pressure for a period of time prior to release, have rendered such valves unsuitable for many purposes.

Techniques to increase the degree of control over the bursting of the diaphragm include the use of electromechanical or explosive means to punch out an opening in the diaphragm. Mechanical diaphragm piercing means, however, are bulky, occupying critically-needed space, and the response time is too slow for certain applications. Examples of the explosive rupturing of diaphragms are shown in U.S. Pat. No. 3,109,553, issued Nov. 5, 1963 to Fike and U.S. Pat. No. 3,469,733, issued Sept. 30, 1969 to Montgomery et al. The device of Fike has not proved altogether satisfactory in use since the edges of the diaphragm tend to curl inward toward the concave side, preventing complete opening and obstructing the flow past the diaphragm. In the patent to Montgomery et al, an explosive charge in flat sheet form is cut into a pattern and converted into a U-shaped groove or score marks on the diaphragm defining the opening. The arrangement of the explosive material relative to the grooves produces a tearing action along these marks when the explosive is initiated.

Similar devices are shown in U.S. Pat. Nos. 3,267,662 to Miller and 3,437,035 to Weimholt, wherein the explosive materials are placed in grooves on a backing element which in turn is mechanically fastened to the diaphragm. The flap opening arrangement of Arnold et al in U.S. Pat. No. 3,777,772 incorporates a weakening groove in the diaphragm with the explosive material in a grooved backing element. All of these explosive methods, however, tend to produce small fragments and splits due to the tearing action that occurs. High velocity fragment are detrimental in many applications. Additionally, this method does not make efficient use of the explosive charge since a tearing action require more force than a positive shearing action. Consequently, with increased pressure and diaphragm thickness, disproportionate increased amounts of explosive material are required for diaphragm rupture.

SUMMARY OF THE INVENTION

Accordingly, it is an object of the invention to provide a highly reliable means for explosively severing material.

Another object of the invention is to provide an explosive severing means that is fragment-free and capable of operation over a wide range of pressures.

Another object of the invention is to provide an explosive severing means which uses a positive shearing action to produce a clean cut.

A further object of the invention is the provision of an explosive severing means which more efficiently utilizes the explosive charge.

Yet another object of the invention is the provision of a reliable, quick-opening explosive valve which uses a positive shearing action to produce fragment-free openings in containers.

Still another object of the invention is to provide an explosive valve in which the explosive material is mechanically held to withstand high levels of shock, vibration and flexing.

A further object of the invention is to provide a positive-shearing, explosive means to remove a containment cover.

Yet a further object of the invention is to provide a positive-shearing, explosive means to sever connected elements.

These and other objects of the invention are attained in a device for explosively shearing material including a grooved support element having an explosive material in the groove and abuttingly supporting the material to be sheared. A backing element abuts the other side of the material to be sheared and includes a shearing edge axially aligned with the centerline of the groove. Electrical detonators initiate the explosive material, forcibly displacing the material against the shearing edge to produce a fragment-free severing of the material. The device has embodiments for different applications, but the essential elements are identical.

BRIEF DESCRIPTION OF THE DRAWINGS

A more complete understanding of the invention and a fuller appreciation of the many attendant advantages thereof will be derived by reference to the following detailed description when considered in connection with the accompanying drawings wherein.

DESCRIPTION OF THE PREFERRED EMBODIMENT

Figure 1:
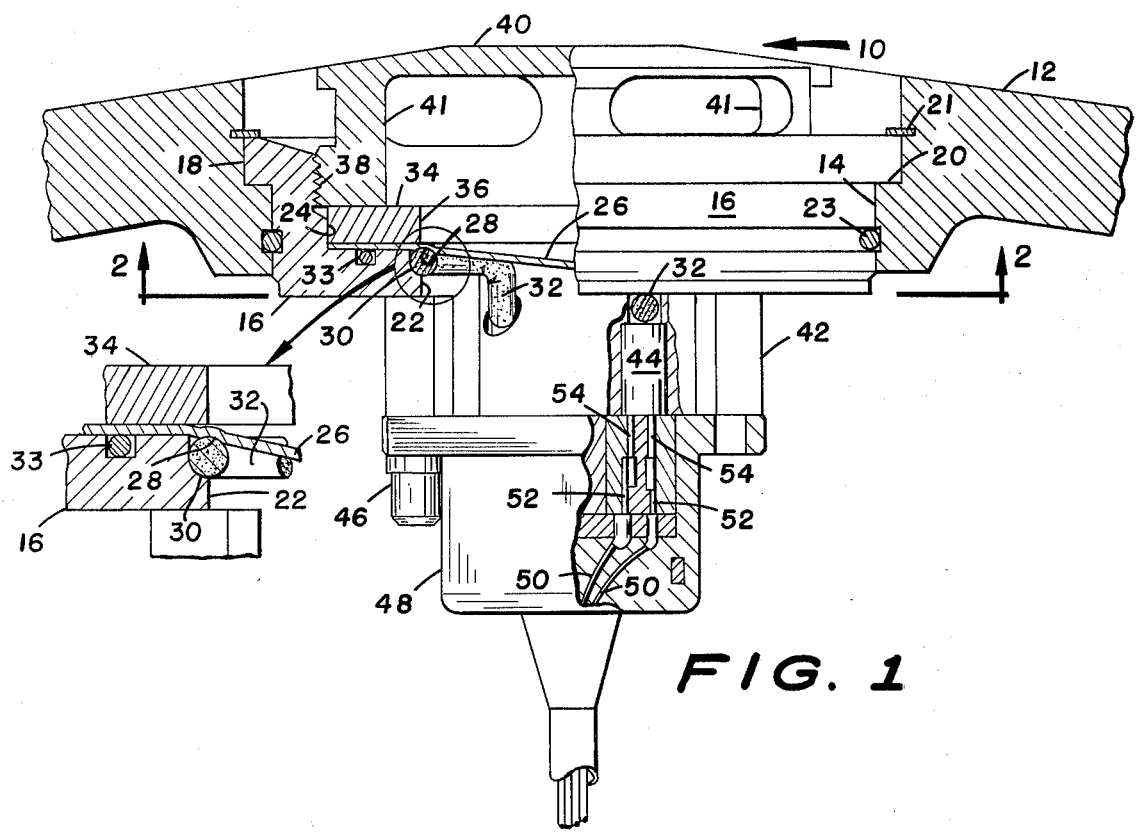
FIG. 1 is a partially sectioned view of a preferred embodiment of the explosive valve assembly of the present invention.

Referring now to the drawings wherein like reference characters designate identical or corresponding parts throughout the several views, and more particularly to FIG. 1 thereof, explosive valve assembly 10 is shown installed in a vessel 12, such as a submerged mine or buoy, which is to be subsequently flooded. Explosive valve 10, preassembled as a complete unit and installed within a receiving bore 14 in vessel 12, is shown to comprise an annular housing 16 having an outwardly-extending, circumferential flange 18 on its exterior surface bearing upon a supporting ridge 20 formed in bore 14 by a counterbore 15. A retaining ring 21 is received within a recess in bore 14 and engages the flange 18 to securely hold the valve assembly 10 within the vessel 12. An O-ring 23 provides a fluid seal between the valve and the vessel. Housing 16 has concentric bores 22 and 24, with bore 22 being smaller and in the shape of the desired opening to be formed in vessel 12. A diaphragm 26 of suitable material, such as stainless steel, and of a size substantially equal to bore 24 rests on the stepped portion of housing 16 joining the bores 22 and 24 to close off bore 22 from the vessel exterior. Diaphragm 26 is provided with an annular groove or depression 28 on its inner surface, as viewed in FIG. 1, of substantially the size of bore 22. The edge of housing 16 defining bore 22 has an arcuate, concave surface 30 which cooperates with diaphragm groove 28 to position and hold the explosive material 32, such a "Detaflex" explosive cord. An O-ring 33 provides a fluid seal between the diaphragm 26 and the valve housing 16.

Overlying the periphery of the diaphragm 26 is a backup plate 34 in the form of an annular ring having an aperture 36 the size of bore 22 and an outer diameter substantially the size of bore 24. In position, the inner opening 36 has its sharp edge diametrically opposite the centerline of diaphragm groove 28 and the explosive cord 32. This unique positioning of the backup plate provides a positive shearing action to cleanly shear the diaphragm, as will be considered more fully below.

Securely received within bore 24, as by threads 38, is a dome-shaped cap 40 having a flush, annular interior end surface which bears upon the backup plate 34 to tightly position the plate 34, diaphragm 26 and explosive cord 32. Cap 40 is provided with a plurality of ports 41 to permit fluid entry through the valve 10 after diaphragm rupture. The positioning of the explosive material 32 within the diaphragm groove 28 and the mechanical securement effected between the backup plate 34 and the concave surface 30 present distinct advantages over adhesive attachment of the explosive material, particularly in a high-shock, high-vibration environment.

Under high external pressure, the diaphragm 26 assumes the curved configuration shown in FIG. 1. This creates a finite clearance between the diaphragm and the sharp edge of the backup plate 34, eliminating direct wearing contact. This curvature, however, is not essential since a clearance gap can conveniently be provided in the backup plate. Even if such clearance is not provided, wearing contact is still negligible.

Figure 2:
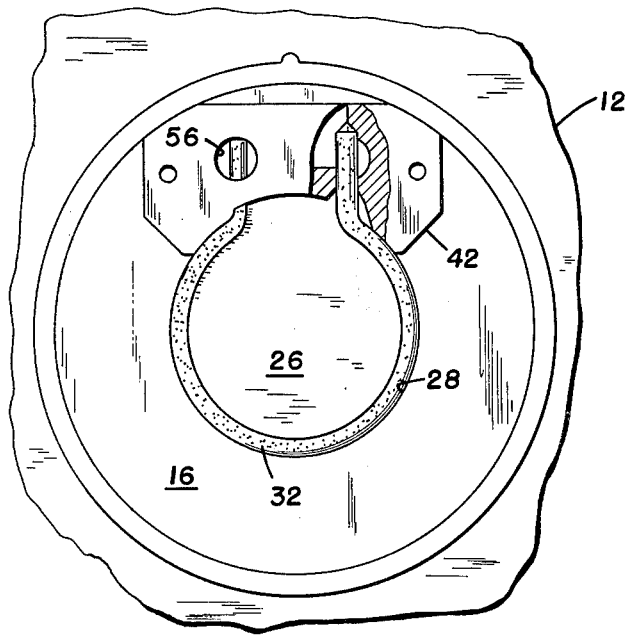
FIG. 2 is a view along line 2—2 of FIG. 1.

As can be seen more clearly in FIG. 2, a view looking "up" along line 2—2 of FIG. 1, groove 28 is circular, extending approximately 300° around diaphragm 26. The explosive material 32 is coextensive with the groove, with the ends extending into the detonator-connector housing 42 to contact the electrical detonators 44 received within the holes 56, described more fully below. The unscored portion of the diaphragm serves to retain the severed flap after explosive activation.

Figure 3:
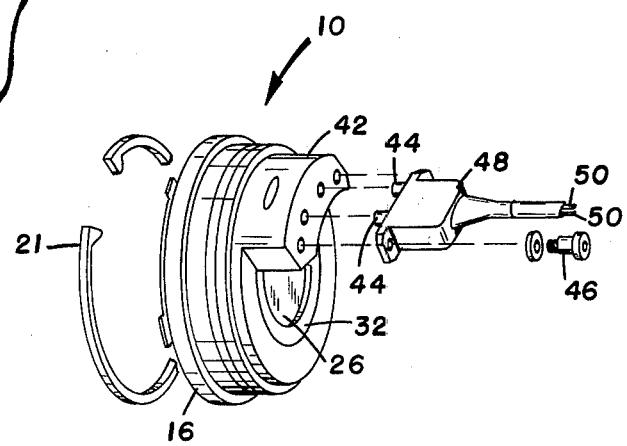
FIG. 3 shows the elements of the explosive valve assembly separated for greater clarity.

FIG. 3 shows the assembly components of valve 10 separated for greater clarity. Integrally formed with and extending from the lower surface of housing 16 is a detonator-connector housing 42 which receives the ends of the explosive cord 32 and the electrical detonators 44. Suitably attached to the connector housing 42, as by threaded fastener 46 (one shown), is the electrical cable assembly 48 containing the electrical leads 50, contacts 52 and detonator pins 54 used to initiate the detonator 44 (FIG. 1).

In operation, the explosive valve assembly 10 is inserted into the bore 14 of the vessel 12 and secured with the retaining ring 21. The electrical leads 50 are connected to suitable control means within the vessel. Upon activation, the detonators 44 initiate the ends of the explosive material 32. Pressure from the resulting explosion, reflected and enhanced by the concave surface 30 supporting the explosive material 32, "throws" the grooved section of diaphragm 26 against the sharp edge of the backup plate 34 to cleanly shear the diaphragm along the groove. The cup-shaped flap is retained by the ungrooved section of the diaphragm.

The use of two electrical detonators improves the reliability of the explosive valve assembly. Initiation of one or both ends of the explosive cord ensures positive detonation of the material and subsequent valve opening. Use of a single detonator is equally acceptable. Similarly, while "Detaflex" cord has been used by way of illustration, other explosive material of different cross-sectional shape are contemplated. Detaflex cord is a convenient material which also permits the use of a thin nylon sleeving to protect the bare cord without affecting its explosive characteristics.

Figure 6:
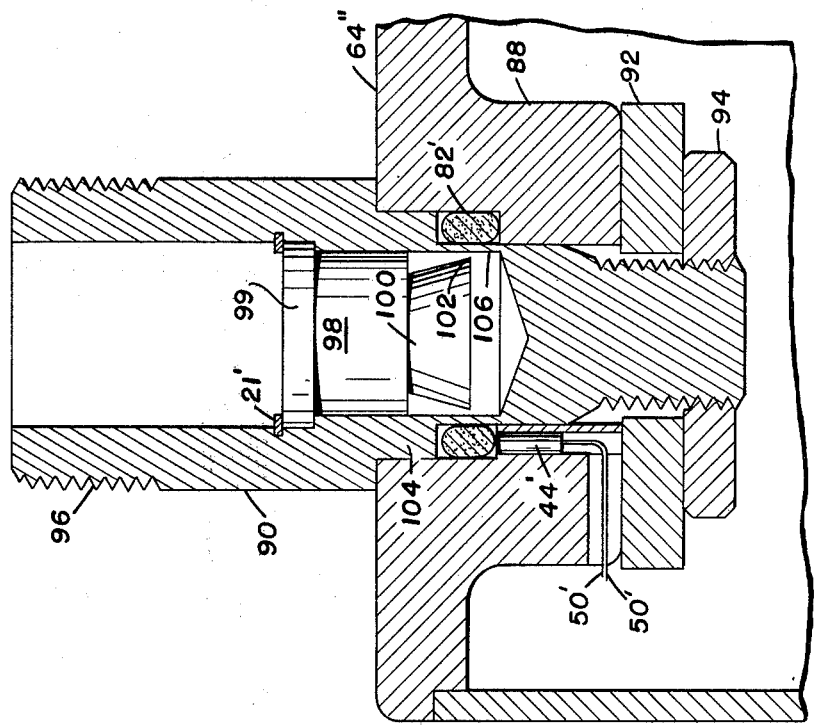
FIG. 6 is an embodiment of the invention as an explosive release mechanism.
Figure 4:
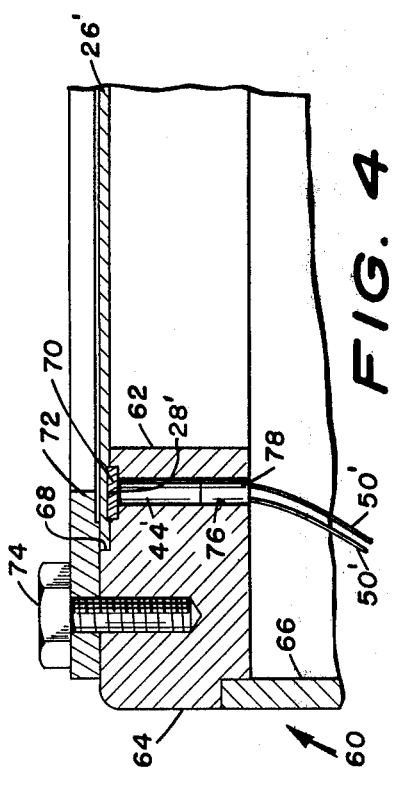
FIG. 4 is an alternate embodiment of the explosive valve assembly of the present invention.
Figure 5:
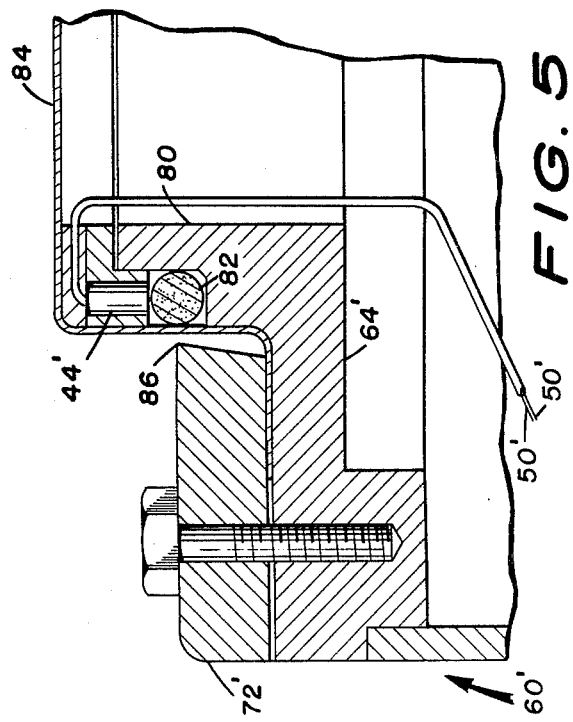
FIG. 5 is another embodiment of the invention as a blow-off cover.

FIGS. 4, 5 and 6 show alternative embodiments of the present invention illustrating different possible applications of the basic essential elements of the explosive valve assembly. For example, FIG. 4 illustrates an arrangement for explosively forming an opening in a containment means 60. The opening is defined by the central aperture 62 in an annular ring or bulkhead 64 secured to the wall 66 of the containment means. A dual-diameter, stepped annular recess 68 is provided in bulkhead 64 to receive and support the diaphragm or cover 26' in the larger-diameter portion of the recess and annular explosive seal 70 in the smaller-diameter portion. Diaphragm 26' has a flat-bottomed annular groove 28' to receive the flat, washer-shaped explosive seal 70 in the position of FIG. 4. Overlying the edge of diaphragm 26' is an annular shear plate 72, secured to bulkhead 64 by fasteners 74 (one shown) and having the inner edge directly adjacent to the centerline of groove 28'. Shear plate 72 is provided with a recessed portion along the inner edge as a clearance gap between the plate and the diaphragm 26'.

An electrical detonator 44' is positioned within a bore 76 adjacent to the explosive seal 70. Electrical contacts 50' connect the detonator to a suitable explosive initiating source and an insulating material 78 seals the detonator 44' in bore 76. Upon initiation, explosive pressure from the seal 70 forces diaphragm 26' against the sharp edge of the shear plate 72, cleanly severing the diaphragm along the centerline of groove 28' to explosively form the opening in the container 60.

The explosive seal 70 can conveniently be washer shaped and be of a resilient explosive material readily available in sheet as well as in cord form to form a flat, compression seal as well as being explosive. This seal, then, supplants an O-ring, as is used in FIG. 1. If a flap is desired rather than a complete opening, then the edge of the shear plate 72 adjacent the diaphragm 26' can be provided with a round, nonshearing section which would retain the diaphragm flap after explosive detonation to control opening.

FIG. 5 illustrates the use of the elements of the present explosive valve assembly as a blow-off cover device. Bulkhead 64' has an upstanding, central neck portion 80 defining the opening in the container 60'. The upper, outer edge portion of the neck 80 is recessed to receive an explosive O-ring 82, formed of resilient explosive cord or molded to shape, and an electrical detonator 44' is positioned adjacent thereto, with the electric firing leads 50' extending from the detonator. A cup-shaped blow-off cover 84 overlies the bulkhead neck 80, with the circumferential edge secured beneath an annular shear plate 72' threadedly attached to the bulkhead 64'. The inner circumferential surface of plate 72' is slanted to form a sharp shearing edge 86 diametrically adjacent to the explosive O-ring 82. In operation, the shearing action is the same as set forth relative to FIGS. 1 and 4, with the blow-off cover 84 being forcibly displaced outwardly and upwardly against the shearing edge 86 to cleanly sever the cover from the container 60'.

The example of an explosive release mechanism shown in FIG. 6 includes a bulkhead 64" having an inwardly-extending neck portion 88 centrally apertured to receive an explosively-severable connecting member 90 attached to the neck portion, as by the washer 92 and nut 94 coacting with threads on the connecting member. The connecting member 90, threaded on its exterior end 96 for securement of the release member, is internally bored to receive a hardened shear plug 98 supporting a shear member 100, which is tapered to form a sharp shearing edge 102. Shear plug 98 is held within the bore by a retaining ring 21' bearing upon the enlarged, flange head 99 of the plug.

At approximately mid-length, the connecting member 90 has two consecutive sections of reduced outer diameter to form a stepped portion; the first section 104 of reduced diameter to permit insertion of the member 90 into the central aperture of bulkhead 64" and the second, reduced-diameter section 106 to receive an explosive, O-ring seal 82'. The wall thickness of reduced-diameter section 106 is such as to permit shearing by the O-ring seal 82', and the axial positioning of this section is directly adjacent the shearing edge 102. An electrical detonator 44' is positioned adjacent the explosive O-ring seal 82' within a receiving bore provided in bulkhead 64" and the customary electrical firing leads 50' are connected thereto.

The pressure from the detonated O-ring seal 82' forces the thin-walled section 106 of connecting member 90 inwardly against the shearing edge 102 to sever the member 90, releasing it and whatever is attached to it from the bulkhead 64".

In the examples of FIGS. 4–6, the explosive seals can be of shapes other than those illustrated and may be of any suitable material, but the unique features of these explosive seals remain: they furnish the source of explosive severing force and provide a fluid seal. Of course, the cover of FIG. 5 and the connecting member 90 of FIG. 6 can be further provided with a groove or depression directly opposite the shearing edges, as taught by FIGS. 1 and 4.

There has thus been disclosed an improved means for explosively forming an opening in containment means in which the explosive material is more securely attached, the explosive charge more efficiently utilized, and a positive shearing action provides for fragment-free openings.

Obviously, numerous modifications and variations of the present invention are possible in the light of the above teachings. It is therefore to be understood that within the scope of the appended claims the invention may be practiced otherwise than as specifically described herein.

What is claimed as new and desired to be secured by Letters Patent of the United States is:

1. A device for explosively shearing material comprising:
    support means positioned adjacent the material to be sheared;
    a groove in the surface of said support means, said groove being adjacent to the material to be sheared;
    an explosive material positioned within said groove;
    a shear member adjacent the material to be sheared on the side opposite said explosive material;
    a shearing edge on said shear member aligned with said groove; and
    means to detonate said explosive material,
    whereby upon detonation of said explosive material, the material to be sheared is forcibly displaced against the shearing edge of said shear member to shear the material.

2. The device of claim 1 wherein the material to be sheared comprises a separate diaphragm member positioned between said explosive material and said shear member.

3. The device of claim 2 further comprising a depression in said diaphragm member aligned with said groove in said support means to receive said explosive material.

4. The device of claim 3 wherein said explosive material comprises an explosive cord and said means to detonate said explosive cord includes an electrically-activated detonator positioned adjacent the end of said cord.

5. The device of claim 4 wherein said shear member comprises an annular ring having an inner diameter defining the size of the sheared diaphragm opening.

6. The device of claim 1 wherein the material to be sheared comprises a separate cover means for a container.

7. The device of claim 6 wherein said shear member comprises a shear plate overlying the periphery of said cover means.

8. The device of claim 7 wherein said explosive material comprises a resilient, explosive O-ring.

9. The device of claim 1 wherein the material to be sheared comprises a connecting member joining separable means.

10. The device of claim 9 further comprising a bore in said connecting member and said shear member includes a shear plug positioned within said bore.

11. The device of claim 10 wherein said explosive material comprises a resilient, explosive O-ring seal.

12. A valve assembly for explosively forming an opening in a container comprising:
    a support member receivable within an opening in the container;
    an aperture in said support member, the peripheral edge defining said aperture having an arcuate surface;
    a diaphragm member overlying said aperture;

an explosive material positioned against the arcuate surface of said aperture and adjacent said diaphragm;

a backing element abutting said diaphragm on the side opposite said explosive material, said backing element having a shear edge aligned with the arcuate surface of said aperture; and explosive detonating means adjacent said explosive material, whereupon detonation of said explosive material, said diaphragm is forcibly displaced against said backing element to shear said diaphragm.

13. The valve assembly of claim 12 wherein said backing element comprises an annular ring having an inner peripheral surface inline with the arcuate peripheral surface of the aperture in said support member.

14. The valve assembly of claim 13 further comprising:

a groove in said diaphragm adjacent said explosive material; and a perforated clamping member abutting said backing element and cooperating with said support member to secure the valve assembly in assembled condition.

15. The valve assembly of claim 14 wherein said explosive material is resilient explosive cord and said explosive detonating means include an electrical detonator positioned adjacent one end of said cord.

16. An explosively-activated removable cover for containers comprising:

a support member attachable to the container and having an aperture therein;

a receiving recess in said support member adjacent said aperture;

an explosive material positioned in said recess:

severable cover means supported by said supported member and overlying said aperture and said recess and said explosive material;

shearing means adjacent to and overlying the edges of said cover means;

a shear edge on said shearing means aligned with said recess; and explosive detonating means adjacent to said explosive material;

whereby detonation of said explosive material forcibly displaces said cover means against the shear edge of said shearing means to sever and remove said cover means from the container.

17. The cover of claim 16 wherein said explosive material comprises a resilient, explosive sealing material and said shearing means comprises an annular plate having said shear edge positioned adjacent the centerline of said recess.

18. An explosively-activated severable connecting device for joining a first means to a separable second means comprising:

a support member attachable to the first means, said member having an aperture therein;

a receiving recess in said support member adjacent said aperture;

an explosive material positioned in said recess;

explosive detonating means adjacent said explosive material;

an elongated connecting member having a first end receivable in said aperture and a second end attachable to the second means;

a bore in said elongated connecting member;

a severable portion of reduced thickness in said connecting member approximate said first end, said portion being positioned adjacent said recess and said explosive material in the assembled condition of the device;

a shear member positioned within said bore adjacent to said portion of reduced thickness; and a shearing edge on said shear member axially aligned with said receiving recess, whereby detonation of said explosive material by said detonating means forcibly displaces the reduced-thickness portion of said connecting member against the shearing edge of said shear member of sever said connecting member and release said first means and said second means.

19. The connecting device of claim 18 wherein said explosive material comprises a resilient, explosive sealing material.

* * * * *